(12) United States Patent
Horng

(10) Patent No.: US 7,794,152 B2
(45) Date of Patent: Sep. 14, 2010

(54) BEARING FOR MOTOR

(75) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 580 days.

(21) Appl. No.: 11/882,745

(22) Filed: Aug. 3, 2007

(65) Prior Publication Data

US 2008/0304778 A1 Dec. 11, 2008

(30) Foreign Application Priority Data

Jun. 11, 2007 (TW) .............................. 96120977 A

(51) Int. Cl.
*F16C 32/06* (2006.01)
(52) U.S. Cl. ........................ 384/100; 384/107; 384/113
(58) Field of Classification Search ................ 384/100, 384/107–124, 276, 286–294
See application file for complete search history.

(56) References Cited

U.S. PATENT DOCUMENTS

| | | | | |
|---|---|---|---|---|
| 5,333,955 A | * | 8/1994 | Papa ........................... | 384/291 |
| 5,435,650 A | * | 7/1995 | Emig et al. .................... | 384/29 |
| 5,839,833 A | * | 11/1998 | Zang .......................... | 384/107 |
| 6,494,621 B2 | * | 12/2002 | Markovitch ................. | 384/292 |
| 6,626,577 B1 | | 9/2003 | Horng et al. | |
| 7,234,871 B2 | | 6/2007 | Maruyama et al. | |
| 7,334,337 B2 | * | 2/2008 | Matsuura ..................... | 29/898 |
| 2006/0257059 A1 | * | 11/2006 | Kubota et al. ............... | 384/293 |

FOREIGN PATENT DOCUMENTS

TW 542317 7/2003

* cited by examiner

Primary Examiner—Thomas R Hannon
(74) Attorney, Agent, or Firm—Muncy, Geissler, Olds & Lowe, PLLC

(57) ABSTRACT

A bearing is mounted in an axle tube of a motor and includes an axial hole for rotatably receiving a shaft of the motor. At least one guiding groove is defined in a peripheral wall defining the axial hole. The guiding groove extends axially from an end face toward but spaced from the other end face. The guiding groove includes a deposit space formed at a bottom thereof for receiving carbide and impurities to enhance the lubricating effect and to prolong the life of the motor.

18 Claims, 8 Drawing Sheets

BEARING FOR MOTOR

BACKGROUND OF THE INVENTION

1. Field of the Invention

The present invention relates to a bearing for a motor and, more particularly, to a bearing including at least one guiding groove defined in a peripheral wall defining an axial hole of the bearing and extending axially into an end face of the bearing for enhancing the lubricating effect.

2. Description of Related Art

FIGS. 1 and 2 show a conventional oily bearing for a motor. The oily bearing 8 includes a central hole 81 extending longitudinally through a central portion thereof for receiving a shaft 9. A plurality of extension grooves 82 are defined in a peripheral wall defining the central hole 81 and located outside the shaft 9 and extends longitudinally from a top face through a bottom face of the oily bearing 8. An example of such an oily bearing is disclosed in Taiwan Patent Publication No. 542317. The extension grooves 82 reduce the friction between the shaft 9 and the oily bearing 8 by reducing the contact area therebetween, thereby lowering the temperature resulting from friction while increasing the amount of lubricant received in the oily bearing 8 to prolong the life of the motor.

However, since bottoms of the extension grooves 82 are in communication with the bottom of the central hole 81 of the oily bearing 8, the lubricant received in the extension grooves 82 is liable to escape during rotation of the rotor 9 and, thus, adversely affects the lubricating effect. Ambient impurities such as dust or particles are liable to enter the gap between the oily bearing 8 and the shaft 9, and the lubricant in the oily bearing 8 is apt to oxidize and turn into carbide at high temperature. The carbide and the impurities increase the friction between the oily bearing 8 and the shaft 9 and, thus, shorten the life of the motor.

OBJECTS OF THE INVENTION

An object of the present invention is to provide a bearing for a motor including at least one guiding groove defined in a peripheral wall defining an axial hole of the bearing and extending axially from one end face of the bearing toward but spaced from the other end face of the bearing, with a deposit space being formed in a bottom of the guiding groove for receiving carbide and impurities to enhance the lubricating effect and prolong the life of the motor.

Another object of the present invention is to provide a bearing for a motor, wherein the guiding groove includes an opening in a radial direction. The opening is in communication with the axial hole of the bearing and has a width smaller than the maximum inner diameter of the guiding groove such that the carbide and the impurities that have entered the guiding groove are difficult to return to the axial hole of the bearing.

A further object of the present invention is to provide a bearing for a motor, wherein the guiding groove includes a guiding section in a top end thereof for guiding impurities into the guiding groove and deposit in the deposit space, thereby enhancing the lubricating effect.

SUMMARY OF THE INVENTION

A bearing for a motor in accordance with the present invention is mounted in an axle tube of a motor and includes an axial hole for rotatably receiving a shaft of the motor. At least one guiding groove is defined in a peripheral wall defining the axial hole. The guiding groove extends axially from an end face toward but spaced from the other end face. The guiding groove includes a deposit space formed at a bottom thereof for receiving carbide and impurities to enhance the lubricating effect and to prolong the life of the motor.

Other objects, advantages and novel features of this invention will become more apparent from the following detailed description when taken in conjunction with the accompanying drawings.

DETAILED DESCRIPTION OF THE PREFERRED EMBODIMENTS

Figure 1:
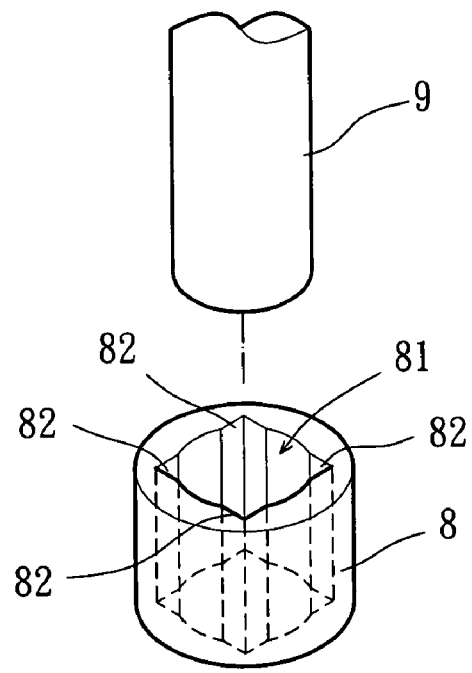
FIG. 1 shows an exploded perspective view of a conventional bearing and a shaft of a motor.
Figure 2:
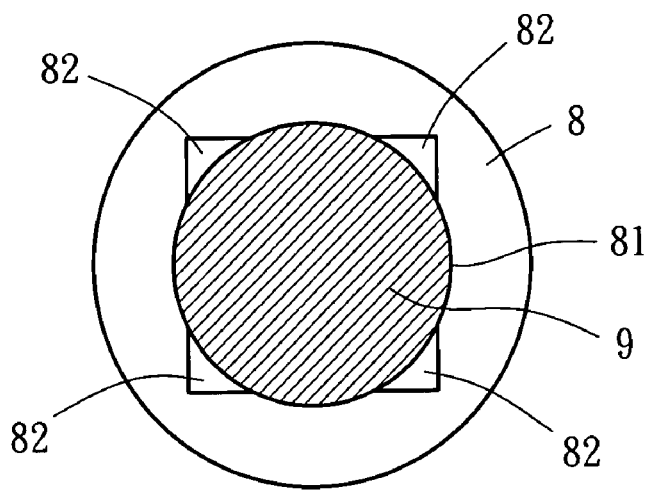
FIG. 2 shows a cross sectional view of the bearing and the shaft of FIG. 1 after assembly.
Figure 3:
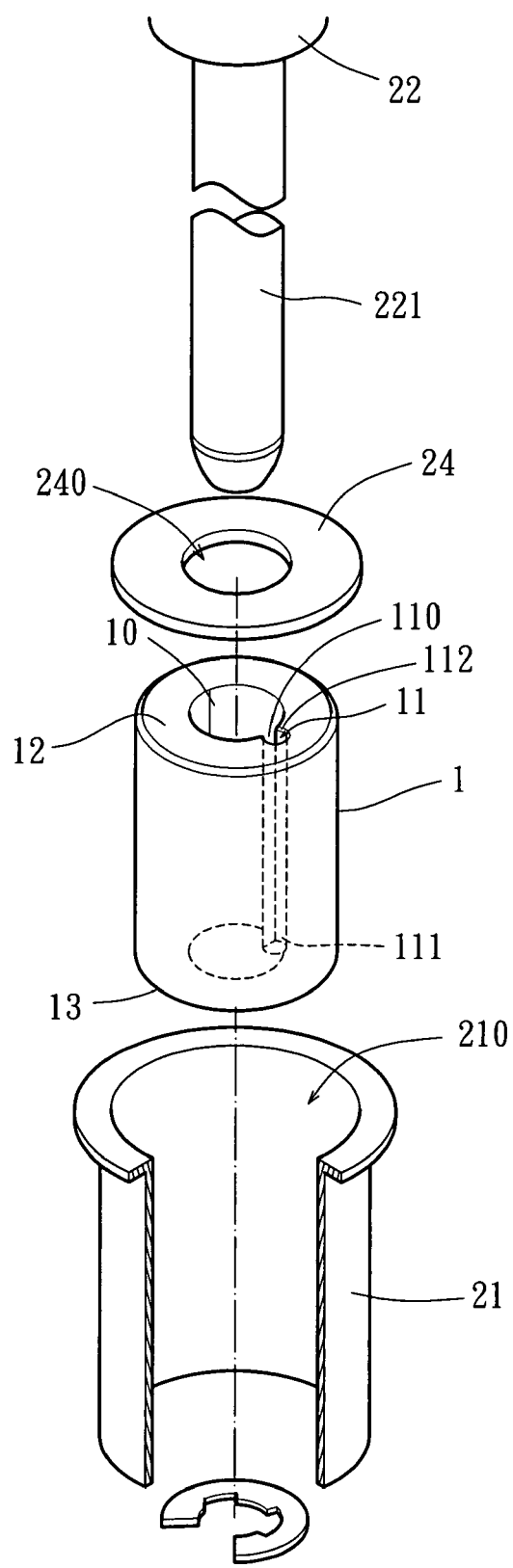
FIG. 3 shows an exploded perspective view of a motor with a bearing according to a first embodiment of the present invention with a stator removed.
Figure 4:
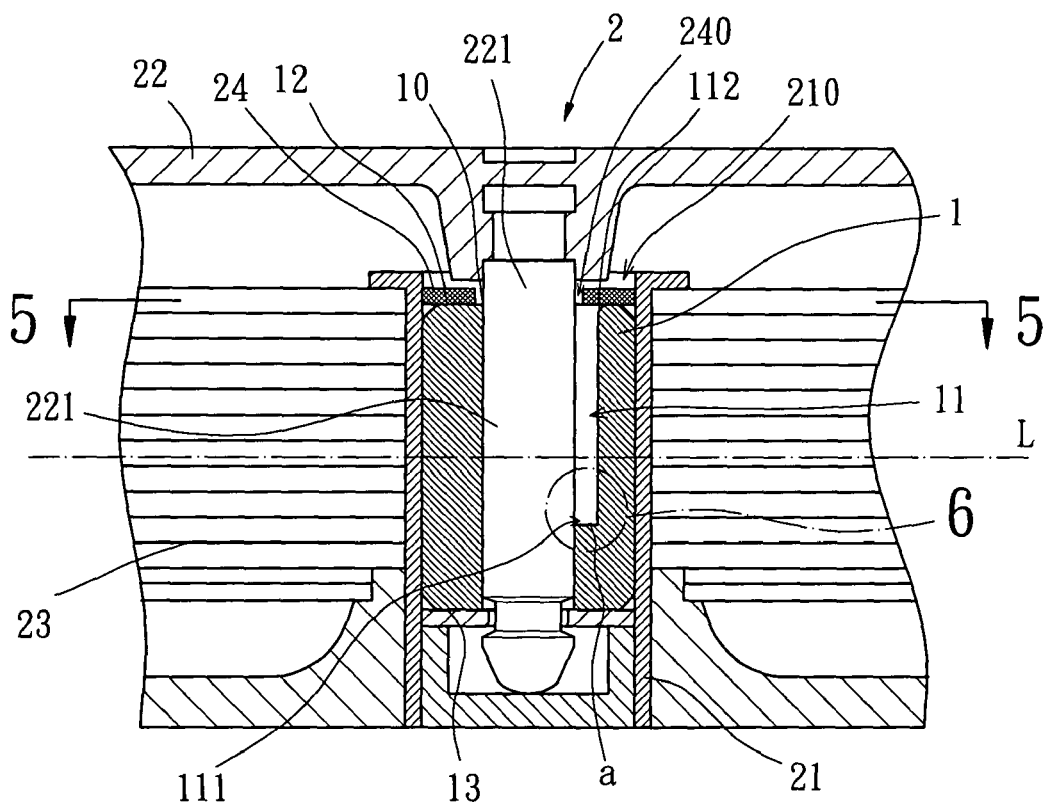
FIG. 4 shows a partial, cross sectional view of the motor of FIG. 3.

With reference to FIGS. 3 and 4, a bearing for a motor 1 according to a first embodiment of the present invention is preferably an oily bearing or a fluid dynamic bearing. The bearing 1 can be utilized on a motor 2 for a heat-dissipating fan or other rotational components. The bearing 1 is mounted in an axle tube 21 of the motor 2 and extended through by a shaft 221 of a rotor 22 of the motor 2 with a stator 23 mounted around the axle tube 21.

The bearing 1 includes an axial hole 10 and at least one guiding groove 11. The bearing 1 includes a first end face 12 and a second end face 13 opposite to the first end face 12. The axial hole 10 extends axially through a central portion of the bearing 1 and rotatably receives the shaft 221 of the rotor 22. The guiding groove 11 is defined in a peripheral wall defining the axial hole 10 extends axially from the first end face 12 toward but spaced from the second end face 13 of the axial hole 10. Lubricant such as oil received in the bearing 1 can be received in the guiding groove 11 to form a lubricant loop. The guiding groove 11 extends from the first end face 12 toward the second end face 13 to a position beyond a central line L passing a middle point of the bearing 1. Namely, the depth of the guiding groove 11 in the axial direction is larger than a half of a height of the bearing 1 in the axial direction. A deposit space 111 is formed at a bottom of the guiding groove 11. Carbide "a" of the lubricant and ambient impurities falling into the bearing 1 can deposit in the deposit space 111 instead of remaining in the lubricant between the shaft 221 and the peripheral wall defining the axial hole 10. In the preferred form shown, the guiding groove has arc-shaped cross sections. Nevertheless, the guiding groove may have trapezoidal or rectangular cross sections or other shapes.

Figure 5:
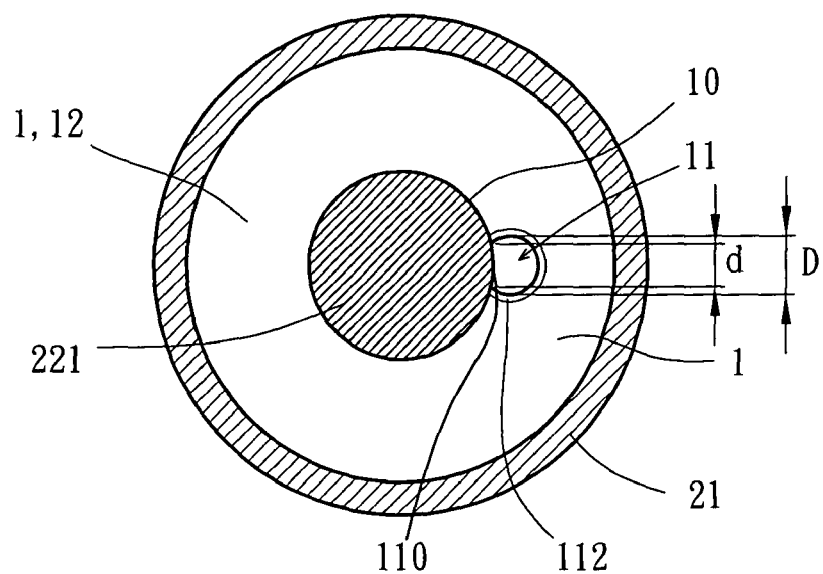
FIG. 5 shows a cross sectional view of the motor of FIG. 4 taken along plane 5-5 in FIG. 4.
Figure 6:
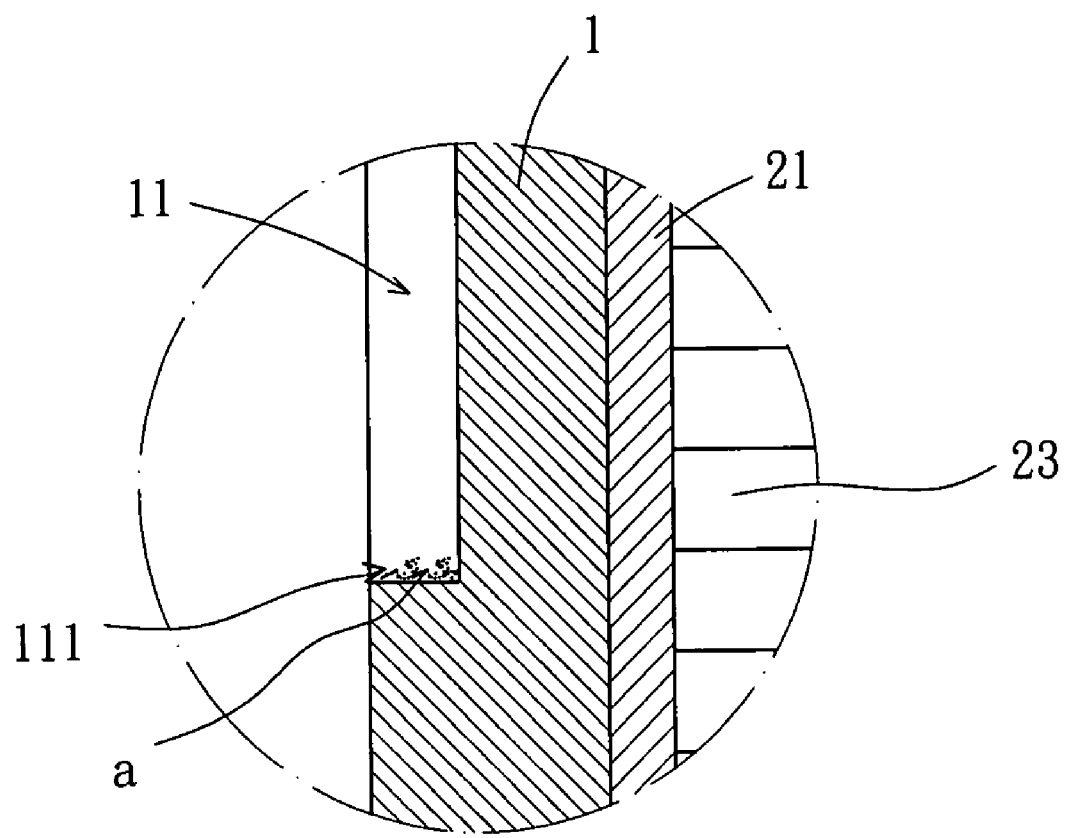
FIG. 6 shows an enlarged view of a circled portion in FIG. 4.

With reference to FIGS. 4 and 5, the guiding groove 11 according to the first embodiment of the present invention includes an opening 110 in a radial direction. Specifically, the opening 110 is in communication with the axial hole 10 in the radial direction and has a width d smaller than the maximum inner diameter D of the guiding groove 11, forming a diameter increasing structure from the opening 110 toward an interior of the guiding groove 11. The guiding groove 11 further includes a guiding section 112 in the upper end with the first end face 12. The guiding section 112 extends toward and meets the first end face 12 at an intersection providing a diameter larger than the maximum inner diameter of the axial hole 10 for shaping a slope, such that impurities on the first end face 12 of the bearing 1 can be easily guided into the guiding groove 11 and deposit in the deposit space 111 of the guiding groove 11.

With reference to FIGS. 3 to 6, the motor 2 further includes a dust shield 24 mounted in a compartment 210 in the axle tube 21 and abutting against the first end face 12 of the bearing 1 also received in the compartment 210. The shaft 221 of the rotor 22 rotatably extends through an axial hole 240 of the dust shield 24 and the axial hole 10 of the bearing 10. A gap exists between the shaft 221 and a peripheral wall defining the axial hole 240 of the dust shield 24 and above the guiding section 112. When the shaft 221 turns at a high speed in the axial hole 10, the lubricant flows between the shaft 221 and the bearing 1 and is also received in the guiding groove 11. The lubricant in the guiding groove 11 flows into a gap between the first end face 12 of the bearing 1 and the dust shield 24 via the guiding section 112 to form a lubricant loop. The temperature resulting from friction between the shaft 221 and the bearing 1 as well as the lubricant rises as the operating time of the motor 2 increases. The lubricant may turn into carbide "a" and deteriorate at high temperature. Meanwhile, ambient impurities such as dust and particles may fall into the gap between the shaft 221 and the bearing 1 via the guiding section 112. Nevertheless, most part of the carbide "a" and the impurities flow with the lubricant into the guiding groove 11 and deposit in the deposit space 111 at the bottom of the guiding groove 11, for they have a specific density larger than that of the lubricant, such that the deposit space 111 is able to receive and collect the carbide "a" and impurities.

With reference to FIGS. 3 to 6, the carbide "a" and the impurities are liable to accumulate in the guiding groove 11 during operation of the shaft 221. Since the width d of the opening 110 of the guiding groove 11 is smaller than the maximum inner diameter D of the guiding groove 11, it is difficult for the carbide "a" and the impurities to return to the tiny gap between the shaft 221 and the bearing 1 after they have entered the guiding groove 11 together with the lubricant. Thus, the amount of the carbide "a" and the impurities between the shaft 221 and the bearing 1 can be effectively reduced, which reduces the friction between the shaft 221 and the bearing 1, enhances the lubricating effect of the bearing 1, and prolongs the life of the motor 2.

Figure 7:
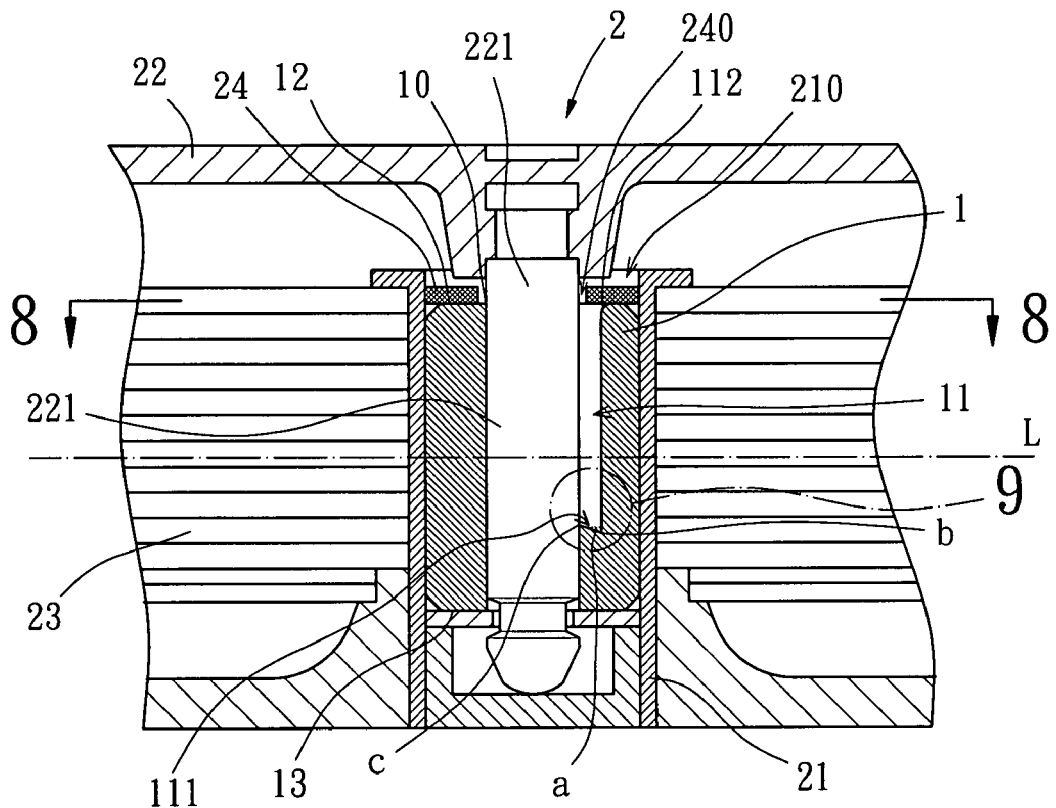
FIG. 7 shows a partial, cross sectional view of a motor with a bearing according to a second embodiment of the present invention.
Figure 8:
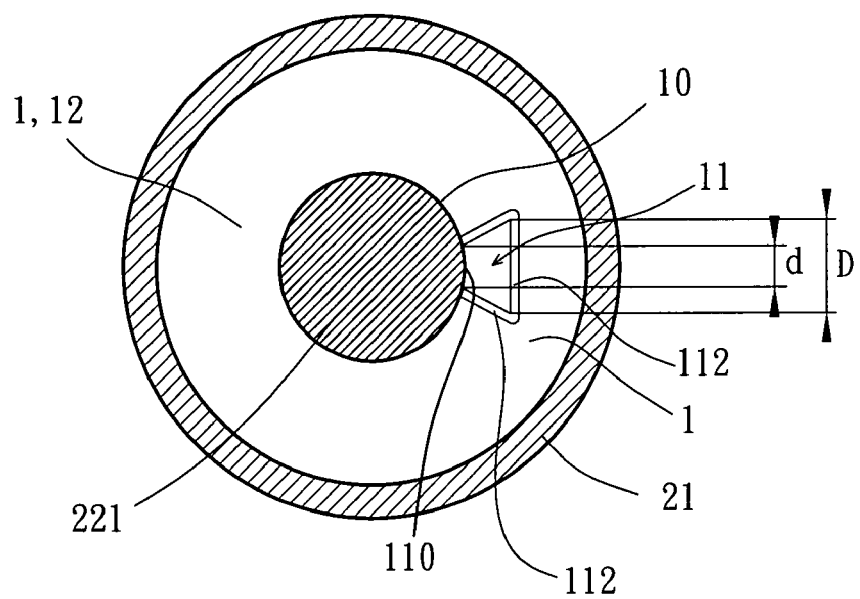
FIG. 8 shows a cross sectional view of the motor of FIG. 7 taken along plane 8-8 in FIG. 7.
Figure 9:
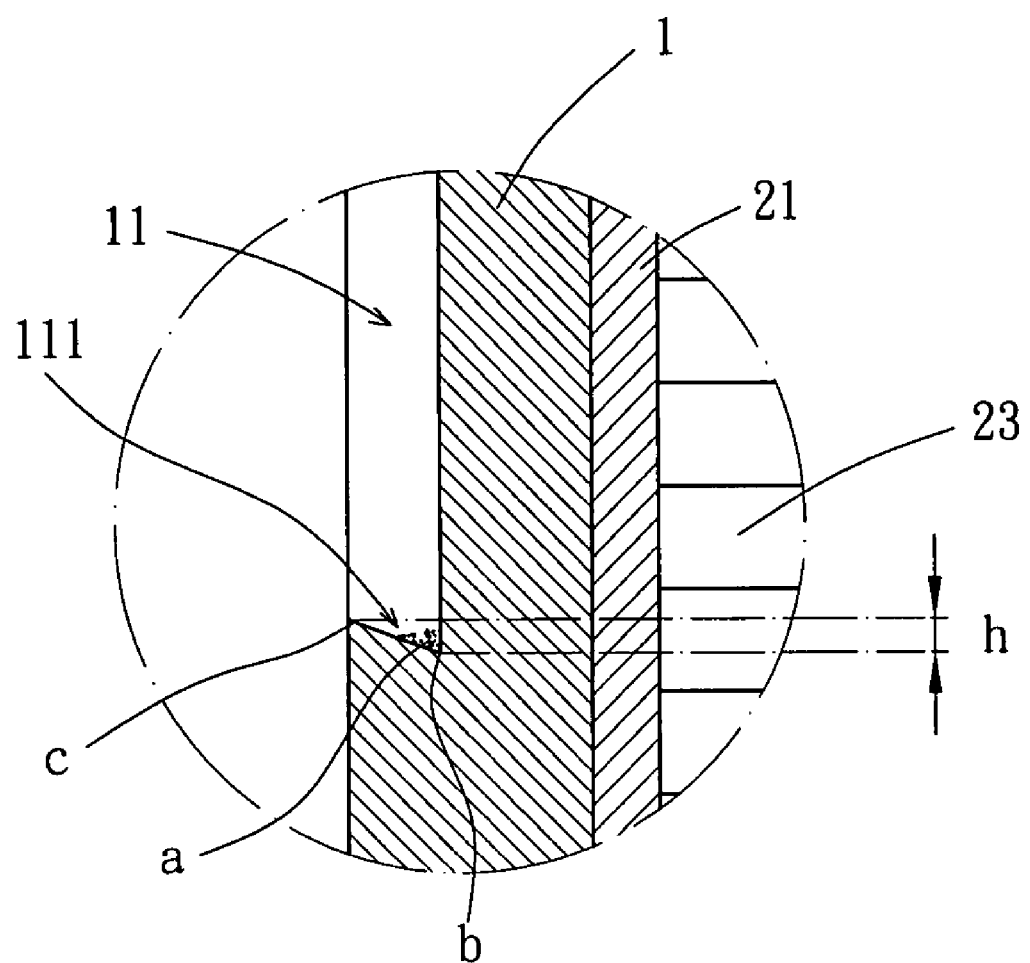
FIG. 9 shows an enlarged view of a circled portion in FIG. 7.

FIGS. 7 to 9 show a motor with a bearing according to a second embodiment of the present invention. Compared to the first embodiment, the bearing 1 of the second embodiment further includes an inclined face at the bottom of the guiding groove 11. The inclined face includes a lower edge b and a higher edge c that is more adjacent to the axial hole 10 than the lower edge b. A deposit space 111 is formed by providing a height difference h between the higher edge c and the lower edge b at the bottom of the guiding groove 11. The guiding groove 11 has substantially trapezoidal cross sections. Since the deposit space 111 is lower than the radial opening 110 of the guiding groove 11, the volume of the deposit space 111 is increased for receiving more carbide "a" and impurities and for preventing the carbide "a" and the impurities from returning to the tiny gap between the shaft 221 and the bearing 10. The lubricating effect of the lubricant is enhanced, and the life of the motor 2 is prolonged.

Figure 10:
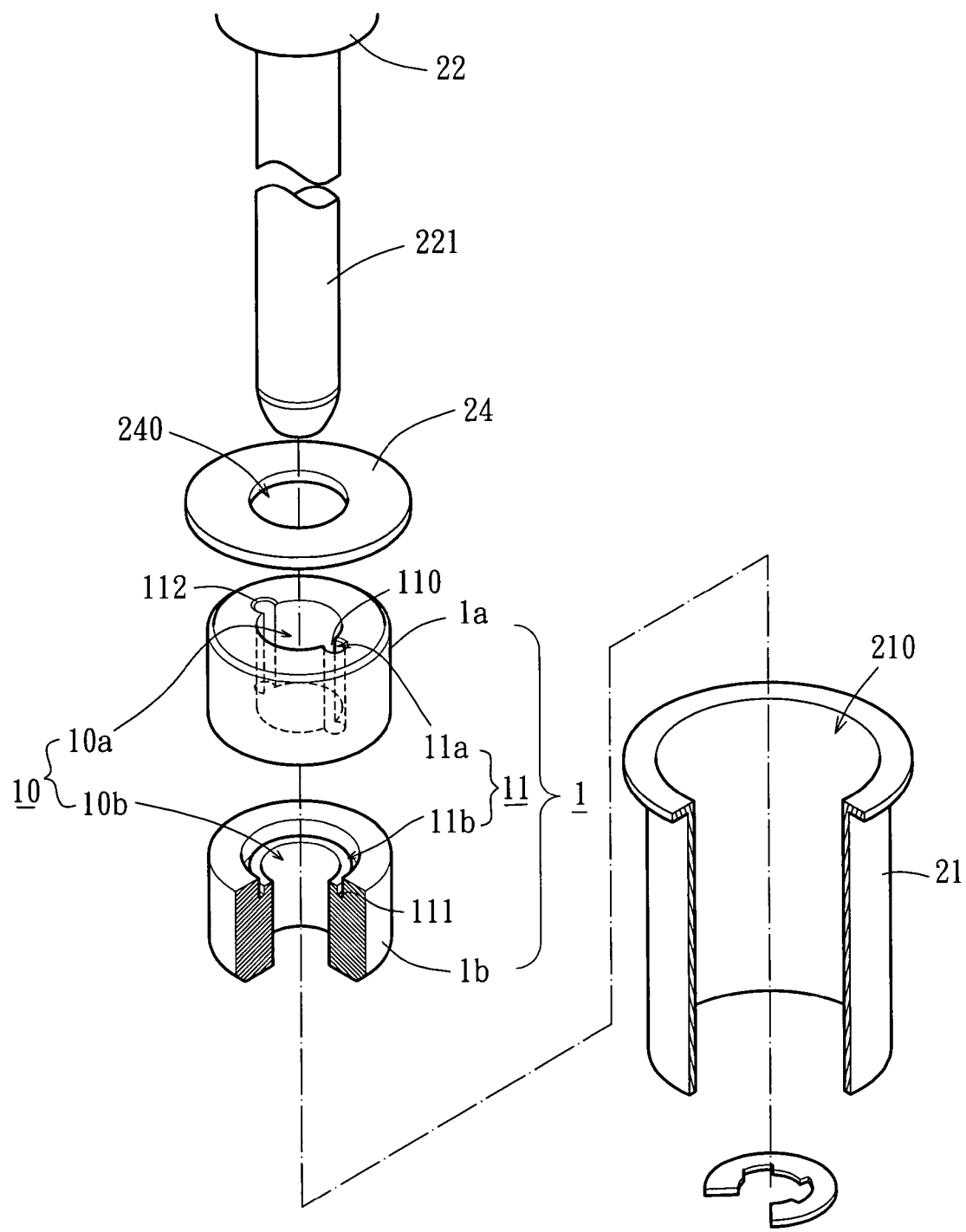
FIG. 10 shows an exploded perspective view of a motor with a bearing according to a third embodiment of the present invention with a stator removed.
Figure 11:
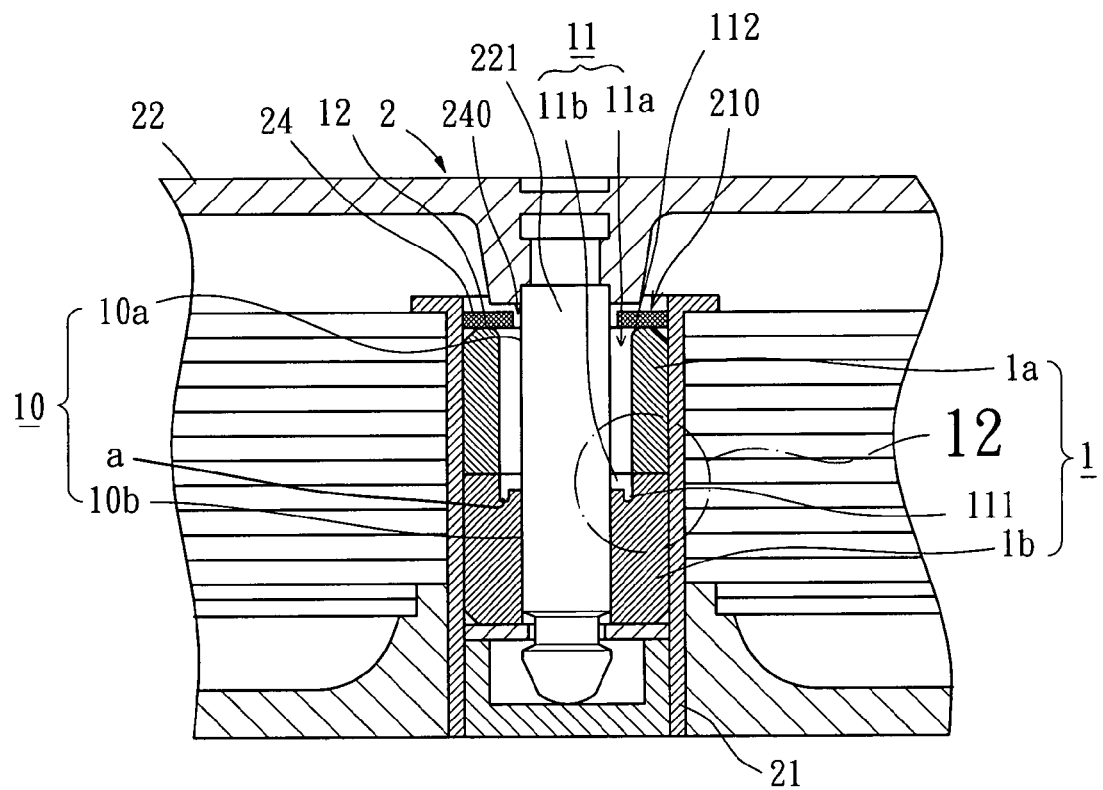
FIG. 11 shows a partial, cross sectional view of the motor of FIG. 10.
Figure 12:
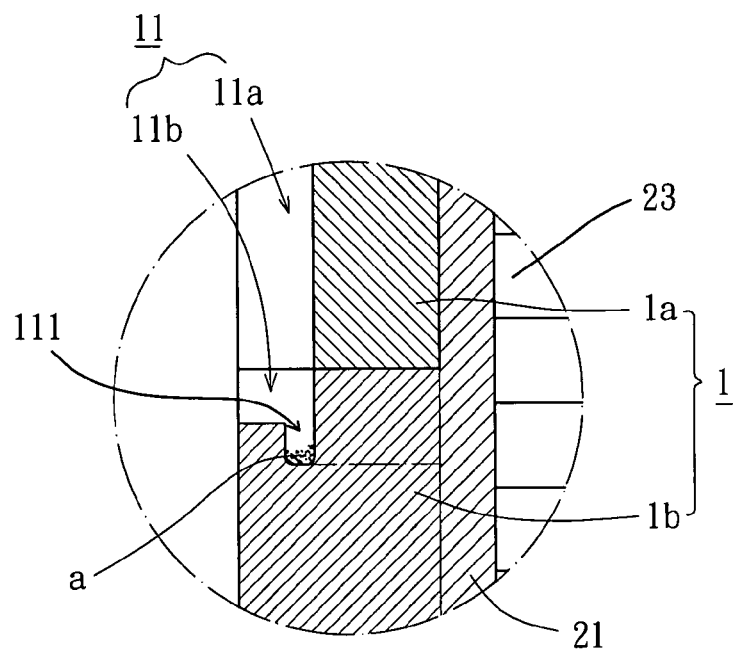
FIG. 12 shows an enlarged view of a circled portion in FIG. 11.

FIGS. 10 to 12 show a motor with a bearing according to a third embodiment of the present invention. Compared to the first embodiment, the bearing 1 of the third embodiment includes an upper bearing portion 1a having an axial hole 10a and a lower bearing portion 1b having an axial hole 10a, with the axial holes 10a, 10b jointly forming the axial hole 10 of the bearing 1. The upper bearing portion 1a includes two upper grooves 11a defined in the peripheral wall defining the axial hole 10a of the upper bearing portion 1a in a symmetrical or unsymmetrical manner. Each upper groove 11a extends from the upper end face through the bottom end face of the upper bearing portion 1a. In an alternative embodiment, the upper bearing portion 1a includes only one upper guiding groove 11a. The lower bearing portion 1b includes a lower guiding groove 11b that is substantially an annular groove surrounding the axial hole 10b of the lower bearing portion 1b and that extends axially from the upper end face of the lower bearing portion 1b toward but spaced from the bottom end face of the lower bearing portion 1b. Furthermore, an annular groove 111 is defined in a bottom wall of the lower guiding groove 11b and spaced from the axial hole 10b of the lower bearing portion 1b. The annular groove 111 forms a deposit space for receiving carbide "a" and impurities.

With reference to FIGS. 10 to 12, the axial length width of the upper guiding grooves 11a is equal to that of the lower guiding groove 11b such that the peripheral wall defining the upper guiding grooves 11a are aligned with the peripheral wall defining the lower guiding groove 11b when the upper and lower bearing portions 1a and 1b are assembled to form a bearing 1. The upper guiding grooves 11a and the lower guiding groove 11b together form a guiding groove 11. The deposit space 111 in the form of an annular groove provides an increased volume for receiving the carbide "a" and impurities and for receiving more lubricant. The lubricating effect of the bearing 1 is enhanced, and the life of the motor 2 is prolonged.

As apparent from the forgoing, the disadvantages of the prior art motor bearing are obviated by the bearings 1 of the present invention that provide a deposit space 111 for receiving carbide and impurities to reduce friction to between the shaft 221 and the bearing 1, thereby enhancing the lubricating effect and prolonging the life of the motor 2.

While the principles of this invention have been disclosed in connection with specific embodiments, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A motor comprising:
an axle tube defining a compartment;
a rotor including a shaft;
a stator mounted around the axle tube;

a dust shield mounted in the compartment of the axle tube; and a bearing mounted in the compartment of the axle tube, with the bearing including an axial hole through which the shaft of the rotor rotatably extends, the bearing including a first end face and a second end face opposite to the first end face, with the bearing further including at least one guiding groove defined in a peripheral wall defining the axial hole, with the guiding groove extending axially from the first end face toward but spaced from the second end face, with the guiding groove including a deposit space formed at a bottom thereof, and with the first end face of the bearing abutting against the dust shield.

2. The motor as claimed in claim 1, with the dust shield including an axial hole through which the shaft rotatably extends, with a gap existing between the shaft and a peripheral wall defining the axial hole of the dust shield and above the guiding groove.

3. The motor as claimed in claim 1, with the guiding groove including a depth larger than a half of a height of the bearing.

4. The motor as claimed in claim 1, with the guiding groove including an opening in communication with the axial hole of the bearing in a radial direction, and with the opening having a width smaller than a maximum inner diameter of the guiding groove.

5. The motor as claimed in claim 1, with the guiding groove including a height difference at the bottom thereof to form the deposit space.

6. The motor as claimed in claim 5, with the guiding groove including an inclined face at the bottom thereof, with the inclined face extending downward and including a lower edge and a higher edge that is more adjacent to the axial hole of the bearing than the lower edge, and with the higher edge and the lower edge providing the high difference to form the deposit space.

7. The motor as claimed in claim 1, with the guiding groove including an annular groove in a bottom wall thereof to form the deposit space.

8. The motor as claimed in claim 7, with the deposit space being spaced from the axial hole of the bearing.

9. The motor as claimed in claim 1, with the guiding groove including a guiding section adjacent to the first end face of the bearing.

10. A bearing for a motor comprising:
a first end face;
a second end face opposite to the first end face;
an axial hole adapted for rotatably receiving a shaft; and
at least one guiding groove defined in a peripheral wall defining the axial hole, with the guiding groove extending axially from the first end face toward but spaced from the second end face, with the guiding groove including an opening in communication with the axial hole of the bearing in a radial direction, with the opening having a width smaller than a maximum inner diameter of the guiding groove, and with the guiding groove including a deposit space formed at a bottom thereof.

11. The bearing for a motor as claimed in claim 10, with an end of the guiding groove adjacent to the second end face including a height difference to form the deposit space.

12. The bearing for a motor as claimed in claim 11, with the guiding groove including an inclined face at the end adjacent to the second end face, with the inclined face extending downward and including a lower edge and a higher edge that is more adjacent to the axial hole of the bearing than the lower edge, and with the higher edge and the lower edge providing the high difference to form the deposit space.

13. The bearing for a motor as claimed in claim 10, with the guiding groove including an annular groove at an end adjacent to the second end face to form the deposit space.

14. The bearing for a motor as claimed in claim 13, with the deposit space being spaced from the axial hole of the bearing.

15. The bearing for a motor as claimed in claim 10, with the guiding groove including a depth larger than a half of a height of the bearing.

16. The bearing for a motor as claimed in claim 10, with the bearing including an upper bearing portion and a lower bearing portion, with the upper bearing portion including an upper guiding groove, and with the lower bearing portion including a lower guiding groove, with the upper and lower guiding grooves being aligned with each other and together forming the guiding groove of the bearing.

17. The bearing for a motor as claimed in claim 16, with the upper bearing portion including an axial hole, with the upper guiding groove being defined in an peripheral wall defining the axial hole of the upper bearing portion, and with the upper guiding groove extending from an end face of the upper bearing portion through another end face of the upper bearing portion.

18. The bearing for a motor as claimed in claim 17, with the lower guiding groove surrounding an axial hole of the lower bearing portion and defined in top end face of the lower bearing portion.

* * * * *